United States Patent
Danzuka et al.

(10) Patent No.: US 9,669,642 B2
(45) Date of Patent: Jun. 6, 2017

(54) INK JET RECORDING APPARATUS AND PRE-TRANSPORTATION PROCESSING METHOD FOR THE APPARATUS

(71) Applicant: CANON KABUSHIKI KAISHA, Tokyo (JP)

(72) Inventors: Toshimitsu Danzuka, Tokyo (JP); Masaya Uetsuki, Yokohama (JP); Kazuo Suzuki, Yokohama (JP); Yoshinori Nakagawa, Kawasaki (JP); Masataka Kato, Yokohama (JP); Tsuyoshi Ibe, Yokohama (JP); Shin Genta, Yokohama (JP); Tomoki Yamamuro, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/157,208

(22) Filed: May 17, 2016

(65) Prior Publication Data

US 2016/0339727 A1    Nov. 24, 2016

(30) Foreign Application Priority Data

May 19, 2015    (JP) .................................. 2015-102294

(51) Int. Cl.
| | |
|---|---|
| *B41J 2/195* | (2006.01) |
| *B41J 29/393* | (2006.01) |
| *B41J 2/175* | (2006.01) |
| *G06F 3/12* | (2006.01) |
| *B41J 29/38* | (2006.01) |
| *B41J 2/165* | (2006.01) |

(52) U.S. Cl.
CPC ......... *B41J 29/393* (2013.01); *B41J 2/16508* (2013.01); *B41J 2/16523* (2013.01); *B41J 2/175* (2013.01); *B41J 2/1752* (2013.01); *B41J 2/17566* (2013.01); *B41J 2/17596* (2013.01); *B41J 29/38* (2013.01); *G06F 3/1207* (2013.01); *G06F 3/1219* (2013.01); *G06F 3/1229* (2013.01)

(58) Field of Classification Search
CPC .. B41J 2/175666; B41J 2/17596; B41J 2/195; B41J 2/1752; B41J 29/393; G06K 3/1219; G06K 3/1229
See application file for complete search history.

(56) References Cited

U.S. PATENT DOCUMENTS

2002/0024543 A1 *   2/2002   Kimura ................ B41J 2/17509
                                                         347/7

FOREIGN PATENT DOCUMENTS

JP        2007-313829 A    12/2007

* cited by examiner

*Primary Examiner* — Juanita D Jackson
(74) *Attorney, Agent, or Firm* — Canon U.S.A. Inc., IP Division (57) ABSTRACT

An ink jet recording apparatus includes a recording head ejecting ink; a buffer tank temporarily storing the ink; a mounting unit to which a main tank that stores the ink is capable of being mounted, the main tank having a first supply port from which the ink is supplied to the recording head and a second supply port from which the ink is supplied to the buffer tank; a first detecting unit detecting an ink volume in the main tank; and a control unit performing a discharge operation to discharge the ink in the buffer tank from the recording head via the main tank in a pre-transportation process in the ink jet recording apparatus. The control unit prompts a user to replace the main tank without performing the discharge operation if the ink volume detected by the first detecting unit is smaller than a threshold value.

10 Claims, 10 Drawing Sheets

FIG. 10

INK JET RECORDING APPARATUS AND PRE-TRANSPORTATION PROCESSING METHOD FOR THE APPARATUS

BACKGROUND OF THE INVENTION

Field of the Invention

The present invention relates to an ink jet recording apparatus and a pre-transportation processing method for the ink jet recording apparatus.

Description of the Related Art

Ink jet recording technologies have hitherto been widely researched and developed because they have an advantage in that, for example, printers are capable of being manufactured at relatively low cost using the ink jet recording technologies and have been in widespread use in consumer equipment including printers and multifunction peripherals. Ink jet recording apparatuses have been used also for recording on relative large recording media, such as sheets of A1 size and A0 size, in recent years.

In a general ink jet recording apparatus (hereinafter also simply referred to as a printer) that performs the recording on a relatively large medium, a main tank that stores ink is connected a recording head that ejects the ink via a supply tube or the like. In many printers, the main tank communicates with atmospheric air via, for example, a buffer tank (buffer room) that temporarily stores the ink. In such a printer, the ink level in the buffer tank is set below an ejection port surface of the recording head in the direction of gravity (so-called water head difference method) to keep the pressure in the recording head to a negative pressure.

When the main body of such a printer is inclined, the pressure in the recording head is changed to a positive pressure or a negative pressure having a large absolute value. As a result, meniscus formed at the ejection ports of the recording head is destroyed to possibly cause leakage of the ink from the election ports or an air communication port of the buffer tank. In addition, when the temperature or the atmospheric pressure of the environment in which the main body of the apparatus is positioned is greatly varied, the air in the recording head, the supply tube, and/or the main tank expands to possibly cause leakage of the ink from the ejection ports or the air communication port of the buffer tank.

The leakage of the ink presents problems in transportation after the apparatus is used (also referred to as secondary transportation) (hereinafter also simply referred to as transportation) because the main body of the apparatus is greatly inclined or the environmental temperature or the atmospheric pressure is greatly varied during the transportation. Accordingly, in transportation of a printer, a method of automatically discharging substantially the entire volume of ink in the printer before the transportation has hitherto been adopted.

In addition, Japanese Patent Laid-Open No. 2007-313829 discloses an apparatus of manually connecting an ink recovery tube to a sub-tank provided between the main tank and the recording head to recover the ink in the printer before transportation.

However, with the apparatus described in Japanese Patent Laid-Open No. 2007-313829, since it is necessary to manually perform the operation while confirming the procedure with reference to a manual or the like in order to recover the ink in the printer, use of the apparatus is troublesome to a user.

Since a lot of ink is discharged with the method of automatically discharging substantially the entire volume of ink in the printer in related art, the waste ink volume is increased. In addition, the waste ink volume is further increased due to, for example, increase in the number of colors of ink in recent years or provision of the sub-tank allowing the main tank to be replaced also during a recording operation.

SUMMARY OF THE INVENTION

The present invention provides an ink jet recording apparatus capable of transporting the ink jet recording apparatus with a small waste ink volume while improving user friendliness and a pre-transportation processing method for the ink jet recording apparatus.

The present invention provides an ink jet recording apparatus including a recording head configured to elect ink; a buffer tank configured to temporarily store the ink; a mounting unit to which a main tank that stores the ink is capable of being mounted, the main tank having a first supply port from which the ink is supplied to the recording head and a second supply port from which the ink is supplied to the buffer tank; a first detecting unit configured to detect an ink volume in the main tank; and a control unit configured to perform a discharge operation to discharge the ink in the buffer tank from the recording head via the main tank in a pre-transportation process in the ink jet recording apparatus. The control unit prompts a user to replace the main tank without performing the discharge operation if the ink volume detected by the first detecting unit is smaller than a threshold value.

The present invention provides an ink jet recording apparatus including a recording head configured to eject ink; a sub-tank configured to store the ink to be supplied to the recording head; a buffer tank configured to temporarily more the ink; a mounting unit to which a main tank that stores the ink is capable of being mounted, the main tank having a first supply port from which the ink is supplied to the sub-tank and a second supply port from which the ink is supplied to the buffer tank; a first detecting unit configured to detect an ink volume in the main tank; and a control unit configured to perform a discharge operation to discharge the ink in the buffer tank from the recording head via the main tank and the sub-tank in a pre-transportation process in the ink jet recording apparatus. The control unit prompts a user to replace the main tank without performing the discharge operation if the ink volume detected by the first detecting unit is smaller than a first threshold value.

Further features of the present invention will become apparent from the following description of exemplary embodiments with reference to the attached drawings.

DESCRIPTION OF THE EMBODIMENTS

Embodiments of the present invention will herein be described with reference to the attached drawings.

First Embodiment

Figure 1:
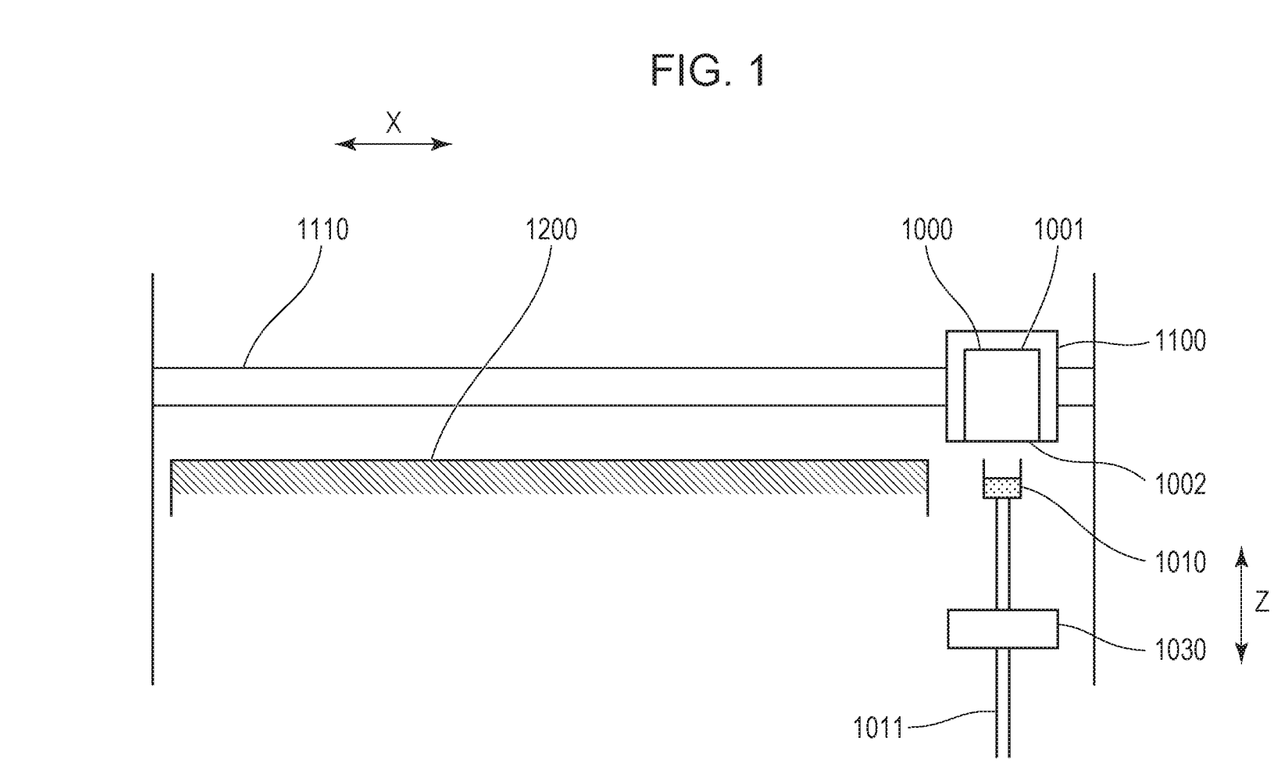
FIG. 1 is a schematic cross-sectional view of an ink jet recording apparatus according to a first embodiment of the present invention.

FIG. 1 is a schematic cross-sectional view of an ink jet recording apparatus according to a first embodiment of the present invention. Referring to FIG. 1, a recording head 1000 has an election port array 1001 that ejects ink to an ejection port surface 1002. In the ejection port array 1001, 1,280 ejection ports from which the ink is ejected are arranged at intervals of 1,200 dots per inch (dpi) in a direction (Y direction) vertical to the plane of paper in FIG. 1. An electrothermal transducer is provided in each ejection port. An electrical signal based on a driving signal is applied to the electrothermal transducer to generate air bubbles in the ink and the pressure of the air bubbles causes the ink to be ejected from the ejection ports.

The recording head 1000 is mounted in a carriage 1100. The carriage 1100 is guided by a guide shaft 1110 and reciprocates in the X direction denoted by a double sided arrow X in FIG. 1 in response to rotation of a carriage motor (not illustrated). A medium (sheet) is intermittently conveyed on a platen 1200 in the Y direction in association with intermittent rotation of a conveying motor (not illustrated). The carriage 1100 reciprocates in the X direction during stop in the intermittent conveyance. The recording head 1000 elects the ink from the election ports to the medium during the reciprocation of the carriage 1100 to perform image recording. Repetition of the intermittent conveyance of the medium and the image recording by the recording head 1000 forms an image on the entire medium.

A cap 1010 covers the ejection ports of the recording head 1000 in order to suppress evaporation of the solvent of the ink from the ejection ports. The cap 1010 reciprocates between a capping position and a separated position in the Z direction denoted by a double sided arrow Z in FIG. 1. The cap 1010 is connected to a suction pump 1030 via a pump tube 1011. The cap 1010 is configured so as to be capable of sucking and discharging the ink under the drive of the suction pump 1030 (suction cap). An ink absorber is provided in the cap 1010. The ink sucked and discharged under the drive of the suction pump 1030 is held in a removable maintenance cartridge (not illustrated). A case is illustrated in FIG. 1 in which the cap 1010 is in the separated position.

Figure 2:
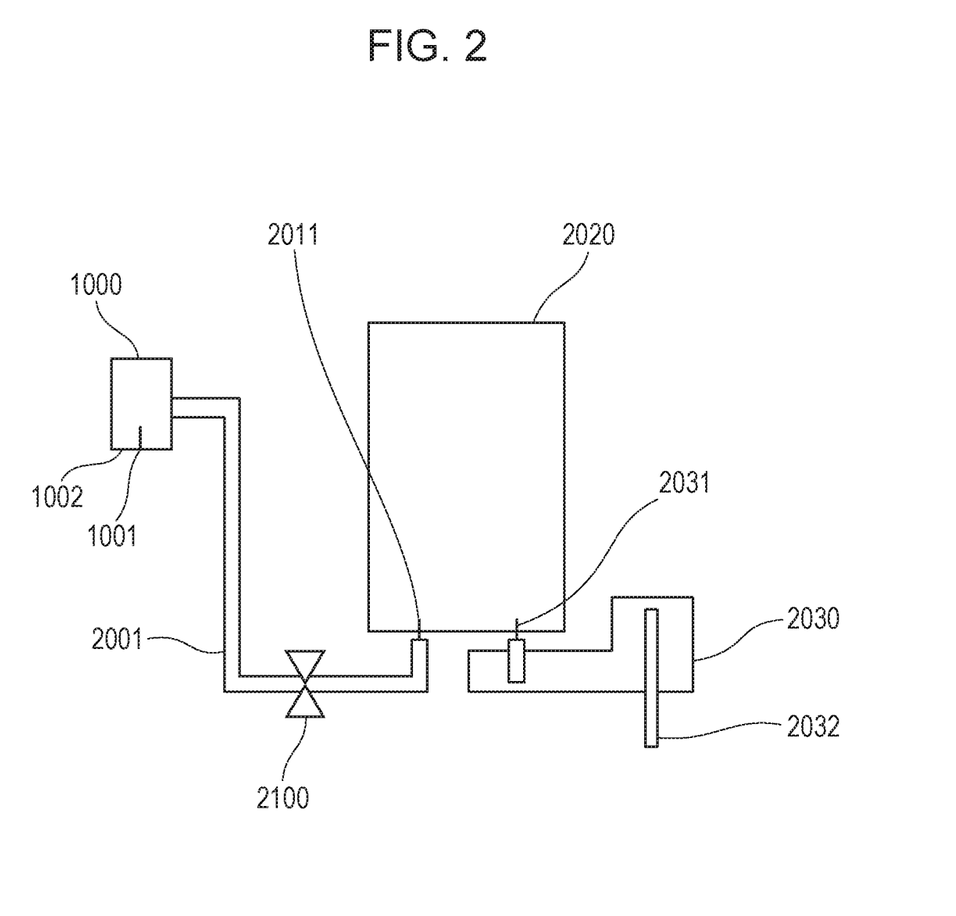
FIG. 2 is a schematic cross-sectional view of an ink supply system according to the first embodiment of the present invention.

An ink supply system in the ink jet recording apparatus having the above configuration will now be described with reference to FIG. 2. FIG. 2 is a schematic cross-sectional view of the ink supply system according to the first embodiment. Referring to FIG. 2, reference numeral 1000 denotes the recording head. The ejection port array 1001 of the recording head 1000 is connected to a mounting unit via a supply tube 2001. A main tank 2020 that stores the ink is capable of being mounted to the mounting unit. The supply tube 2001 is provided with a hollow supply needle 2011 at a joint portion with the mounting unit. The supply needle 2011 passes through a rubber stopper provided in the opposing main tank 2020 when the main tank 2020 is mounted to the mounting unit. The passing of the supply needle 2011 through the rubber stopper causes the ejection port array 1001 of the recording head 1000 to communicate with the main tank 2020. The supply tube 2001 is provided with an on-off valve 2100 near the main tank 2020. The on-off valve 2100 is capable of switching between an open state in which the main tank 2020 communicates with the ejection port array 1001 of the recording head 1000 and a closed state in which the main tank 2020 does not communicate with the ejection port array 1001 of the recording head 1000.

A buffer tank 2030 is provided with a hollow supply needle 2031. The supply needle 2031 passes through a rubber stopper provided in the opposing main tank 2020 when the main tank 2020 is mounted to the mounting unit. The buffer tank 2030 is provided with an air communication port 2032. The passing of the supply needle 2031 through the rubber stopper causes the main tank 2020 to communicate with the air via the buffer tank 2030. The buffer tank 2030 temporarily stores the ink supplied from the main tank 2020. The ink level in the buffer tank 2030 is positioned below the ejection port surface 1002 of the recording head 1000 in the direction of gravity. Accordingly, the pressure in the recording head 1000 is kept at a negative pressure due to the so-called water head difference. The meniscus formed at the ejection ports is not destroyed owing to the water head difference.

The ink jet recording apparatus includes a dot counter that calculates the ink volume ejected or discharged from the ejection port array 1001 from a value resulting from multiplication of the number of droplets of the ink by the volume of one droplet or the amount of discharge. The ink volume in the main tank is capable of being detected with the dot counter. The main tank 2020 in the first embodiment includes a memory that stores the ink volume in the main tank 2020. The mounting state of the main tank 2020 to the mounting unit is capable of being determined on the basis of whether power is supplied to the memory.

Figure 3:
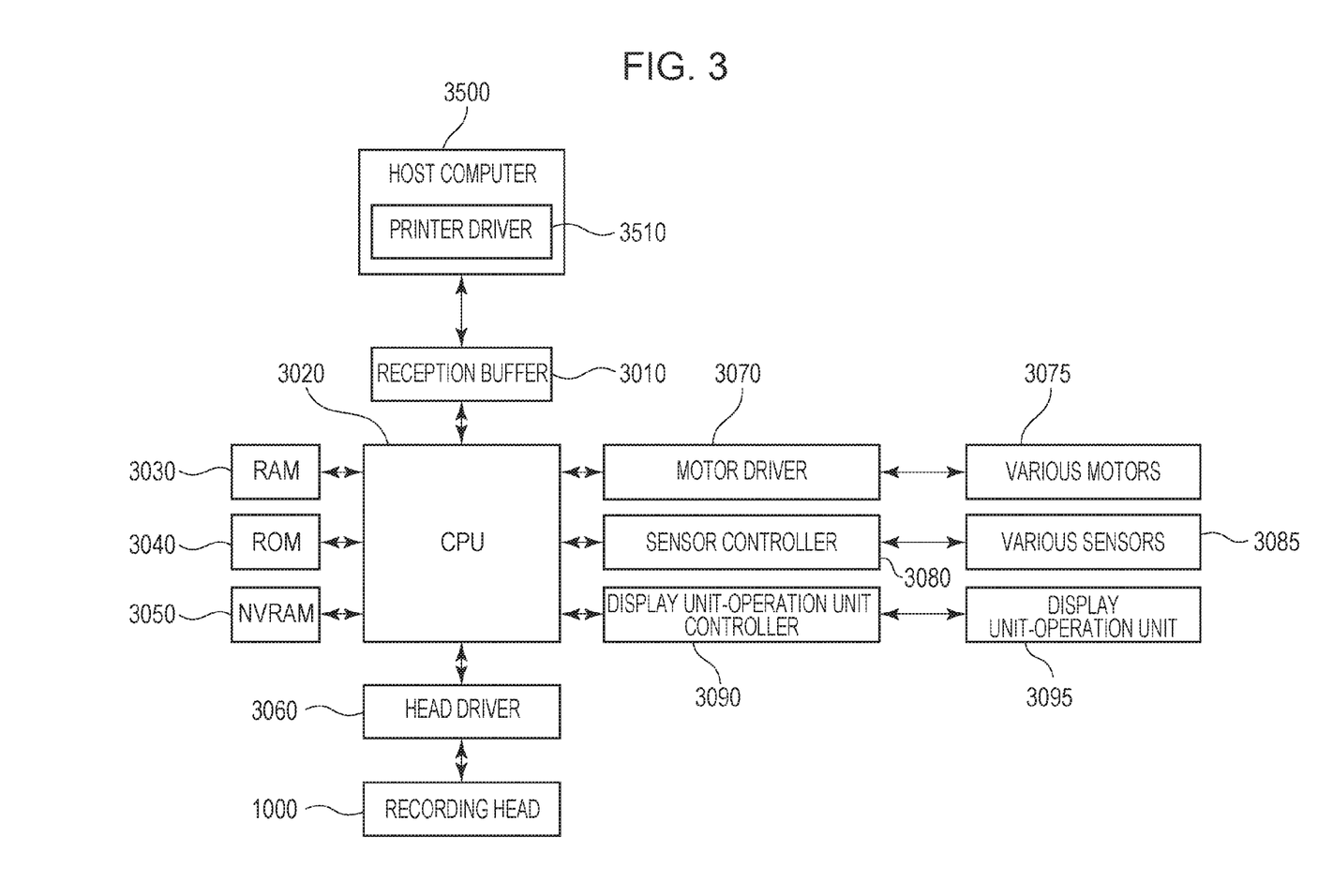
FIG. 3 is a block diagram illustrating a control system according to embodiments of the present invention.

A control system in the ink jet recording apparatus according to the first embodiment will now be described with reference to a block diagram illustrated in FIG. 3. Referring to FIG. 3, a host computer 3500 is connected to the ink jet recording apparatus via, for example, a universal serial bus (USB) interface. A printer driver 3510 is stored in the host computer 3500 in the form of software. The printer driver 3510 generates print data from image data about a document or a picture that is desired by a user in response to a printing instruction from the user and transmits the generated print data to the ink jet recording apparatus. A reception buffer 3010 stores the print data transmitted from the host computer 3500 to the ink jet recording apparatus and so on. The print data and so on held in the reception buffer 3010 is transferred to a random access memory (RAM) 3030 under the control of a central processing unit (CPU) 3020 and is temporarily stored in the RAM 3030. A read only memory (ROM) 3040 stores programs, fixed data, and so on necessary for a variety of control in the ink jet recording apparatus. A non-volatile RAM (NVRAM) 3050 stores necessary information also when the ink jet recording apparatus is turned off. A head driver 3060 is used to drive the recording head 1000. A motor driver 3070 is used to drive various motors 3075 including a carriage motor, a conveying motor, a motor for moving up and down the cap, and a motor for opening and closing the on-off valve. A sensor controller 3080 controls various sensors 3085. A display unit-operation unit controller 3090 controls a display unit-operation unit 3095 in the ink jet recording apparatus. The CPU 3020 performs various processing operations including calculation, control, determination, and setting with the RAM 3030, the RPM 3040, the NVRAM 3050, and so on.

A pre-transportation processing sequence and a post-transportation processing sequence in the ink jet recording apparatus having the above configuration will now be described with reference to flowcharts illustrated in FIG. 4 and FIG. 5, respectively.

Figure 4:
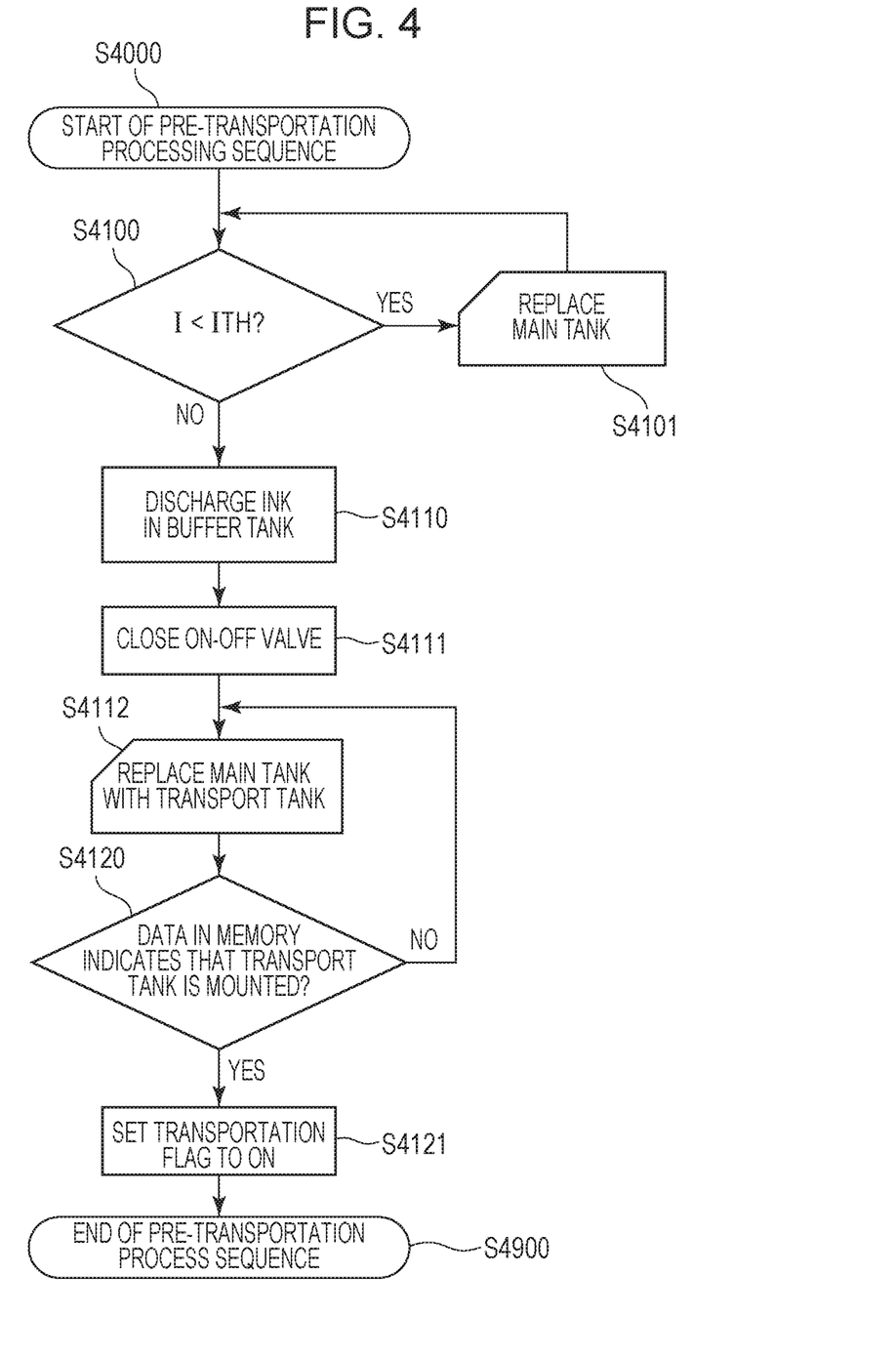
FIG. 4 is a flowchart illustrating a pre transportation processing sequence in the ink jet recording apparatus according to the first embodiment of the present invention.

FIG. 4 is a flowchart illustrating the pre-transportation processing sequence in the ink jet recording apparatus. The pre-transportation processing sequence according to the first embodiment is started upon depression of a Start key in the display unit-operation unit 3095 in the ink jet recording apparatus. It is preferred that guidance or the like be appropriately given to the user with the display unit-operation unit 3095 in the pre-transportation processing sequence and the post transportation processing sequence described below.

Referring to FIG. 4, in Step S4000, the pre transportation processing sequence is started. An ink volume I in the main tank 2020 is detected with the dot counter described above. In Step S4100, it is determined whether the ink volume I is smaller than a predetermined threshold value ITH. The threshold value ITH in the first embodiment is 9 ml. If the determination in Step S4100 is affirmative, that is, if the ink volume I is smaller than the threshold value ITH (YES in Step S4100), the processing sequence goes to Step S4101. In Step S4101, the user is prompted to replace the main tank 2020 and the processing sequence waits for replacement of the main tank 2020. The reason why the main tank 2020 is replaced will be described below. Upon detection of replacement of the main tank 2020, the processing sequence returns to Step S4100. If the determination in Step S4100 is negative, that is, if the ink volume I is larger than or equal to the threshold value ITH (NO in Step S4100), the processing sequence goes to Step S4110.

In Step S4110, the suction pump 1030 is driven in a state in which the cap 1010 is at the capping position to discharge the ink from the ejection port array 1001. At this time, the on-off valve 2100 is set to the open state. The ink discharged into the cap 1010 or the pump tube 1011 through a sequence, such as idle suction, is led to the maintenance cartridge to be held therein. Substantially the entire volume of ink in the buffer tank 2030 is discharged through this discharge operation (the discharge of the ink in the buffer tank). The amount of discharge in the discharge operation in the first embodiment is about 8 ml.

The amount of discharge and the threshold value ITH will now be described. Since the ink volume in the buffer tank 2030 is greatly varied with variation in the environmental temperature or the like, it is difficult to determine the ink volume in the buffer tank 2030. Accordingly, the amount of discharge is set in consideration of the maximum ink volume held in the buffer tank 2030. However, if the ink volume I in the main tank 2020 is smaller than the threshold value ITH, the air may possibly flow into an ink flow path between the on-off valve 2100 and the recording head 1000 in the supply tube 2001 through the discharge operation. When the air flows into the ink flow path between the on-off valve 2100 and the recording head 1000 in the supply tube 2001, the air may expand due to the variation in the environmental temperature or the atmospheric pressure while the ink jet recording apparatus is being transported in the state in which the on-off valve 2100 is closed to cause the ink to leak from the ejection port array 1001. Accordingly, in order to prevent such a situation, the main tank 2020 is replaced if the ink volume I is smaller than the threshold value ITH.

Referring back to the flowchart in FIG. 4, after Step S4110, in Step S4111, the on-off valve 2100 is closed. After the on-off valve 2100 is closed, in Step S4112, the user is prompted to replace the main tank 2020 with a transport tank and the processing sequence waits for replacement of the main tank 2020 with the transport tank. In the first embodiment, the transport tank includes a memory similar to that in the main tank 2020. Data indicating that the tank is the transport tank is stored in the memory. No ink is held in the transport tank. The transport tank preferably has an external shape similar to that of the main tank 2020 and has a capacity smaller than that of the main tank 2020.

Upon detection of the replacement of the main tank 2020, in Step S4120, it is determined whether the transport tank is mounted to the mounting unit with reference to the data in the memory. If the determination in Step S4120 is negative, that is, if it is determined that the main tank 2020 filled with the ink is mounted to the mounting unit (NO in Step S4120), the processing sequence returns to Step S4112 to wait for replacement of the main tank 2020 with the transport tank. If the determination in Step S4120 is affirmative, that is, if it is determined that the transport tank is mounted to the mounting unit (YES in Step S4120), the processing sequence goes to Step S4121. In Step S4121, a transportation flag is set to ON. The transportation flag is used in the post-transportation processing sequence. The transportation flag will be described below.

After the transportation flag is set to ON, the apparatus is automatically turned off and, in Step 4900, the pre-transportation processing sequence is terminated. At this time, the cap 1010 is at the capping position.

The pre-transportation processing sequence described above prevents leakage of the ink during the transportation without discharging substantially the entire volume of ink in the ink jet recording apparatus. The advantages of the pre-transportation processing sequence will now be described.

First, since no ink is held in the transport tank, the ink is not pushed into the buffer tank 2030 even if the air in the transport tank expands due to the great variation in the environmental temperature or the atmospheric pressure during the transportation. In addition, since substantially the entire volume of ink in the buffer tank 2030 is discharged in step S4110, the ink does not leak from the air communication port 2032 even if the air in the buffer tank 2030 expands. Furthermore, even if a small amount of air exists between the on-off valve 2100 and the main tank 2020 in the supply tube 2001 and the air expands, the small amount of air only moves into the transport tank and leakage of the ink does not occur. The increase in pressure caused by the expansion of the small amount of air existing between the on-off valve 2100 and the recording head 1000 in the supply tube 2001 or the small amount of air existing in the recording head 1000 is cleared by distortion of a flexible member provided in the recording head 1000. Accordingly, even if the air in the ink supply system of the apparatus expands due to the great variation in the environmental temperature or the atmospheric pressure during the transportation, leakage of the ink does not occur.

Next, a case will be described in which the ink jet recording apparatus is inclined during the transportation. Since the on-off valve 2100 is closed in Step S4111, the pressure in the recording head is not changed to a positive pressure or a negative pressure having a large absolute value even if the ink jet recording apparatus is greatly inclined. Accordingly, the meniscus formed at the ejection ports is not destroyed. Consequently, no air flows into the election ports and no ink leaks from the ejection ports. In addition, since substantially the entire volume of ink in the buffer tank 2030 is discharged in Step S4110, no ink leaks from the air communication port 2032 even if the ink jet recording apparatus is greatly inclined.

As described above, it is possible to prevent leakage of the ink during the transportation without discharging substantially the entire volume of ink in the ink jet recording apparatus.

The post-transportation (when the ink jet recording apparatus is started) processing sequence in the ink jet recording apparatus according to the first embodiment will now be described with reference to FIG. 5. FIG. 5 is a flowchart illustrating the post-transportation processing sequence according to the first embodiment. The post-transportation processing sequence is started when the transportation flag is set to ON upon turning on of the ink jet recording apparatus.

Figure 5:
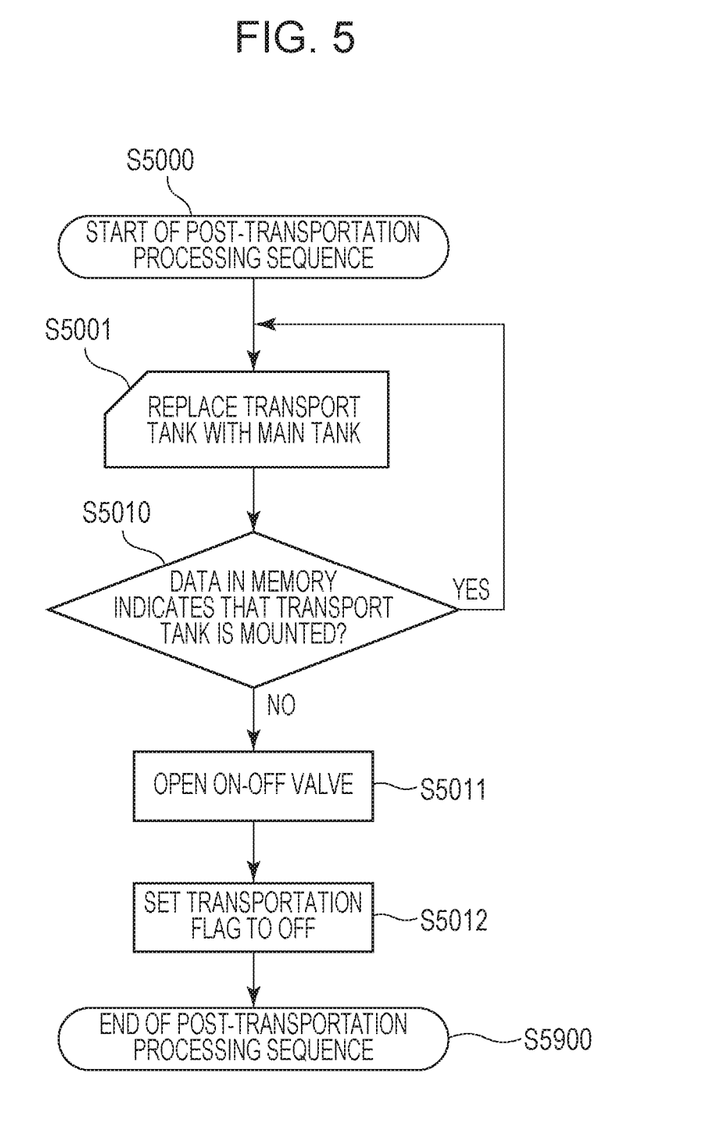
FIG. 5 is a flowchart illustrating a post-transportation processing sequence in the ink jet recording apparatus according to the first embodiment of the present invention.

Referring to FIG. 5, in Step S5000, the post-transportation processing sequence is started. In Step S5001, the user is prompted to replace the transport tank with the main tank 2020 and the processing sequence waits for replacement of the transport tank with the main tank 2020. In Step 35010, it is determined whether the transport tank is mounted to the mounting unit with reference to the data in the memory described above. If the determination in Step 35010 is affirmative, that is, if it is determined that the transport tank is mounted to the mounting unit (YES in Step S5010), the processing sequence returns to Step S5001 to wait for replacement of the transport tank with the main tank 2020. If the determination in Step S010 is negative, that is, if it is determined that the main tank filled with the ink is mounted to the mounting unit (NO in Step S5010), the processing sequence goes to Step S5011. In Step S5011, the on-off valve 2100 is set to the open state. After Step S5011, the processing sequence goes to Step S5012.

In Step S5012, the transportation flag is set to OFF. In Step S5900, the post-transportation processing sequence is terminated. After the post-transportation processing sequence is terminated, it is preferred that a recovery process or the like suitable for the time when the ink jet recording apparatus has been left be appropriately performed.

The post-transportation processing sequence according to the first embodiment allows the ink jet recording apparatus to be transported with a small waste ink volume while improving user friendliness.

Whether the mounted main tank is the transport tank is determined with reference to the data in the memory provided in the transport tank in the first embodiment. However, the first embodiment is not limited to this. For example, whether the transport tank is mounted to the mounting unit may be determined on the basis of depression of a mechanical switch by a protrusion provided on the transport tank. Alternatively, whether the transport tank is mounted to the mounting unit may be determined with another method, for example, on the basis of the presence of electric conductivity.

Although the example is described in the first embodiment in which the transport tank is mounted for transportation, the first embodiment is not limited to this. For example, the main tank that stores an ink volume of approximately zero may be mounted for transportation. In this case, after confirming that the value of the ink volume in the memory provided in the main tank is equal to approximately zero, the pre-transportation processing sequence is terminated.

Second Embodiment

Figure 6:
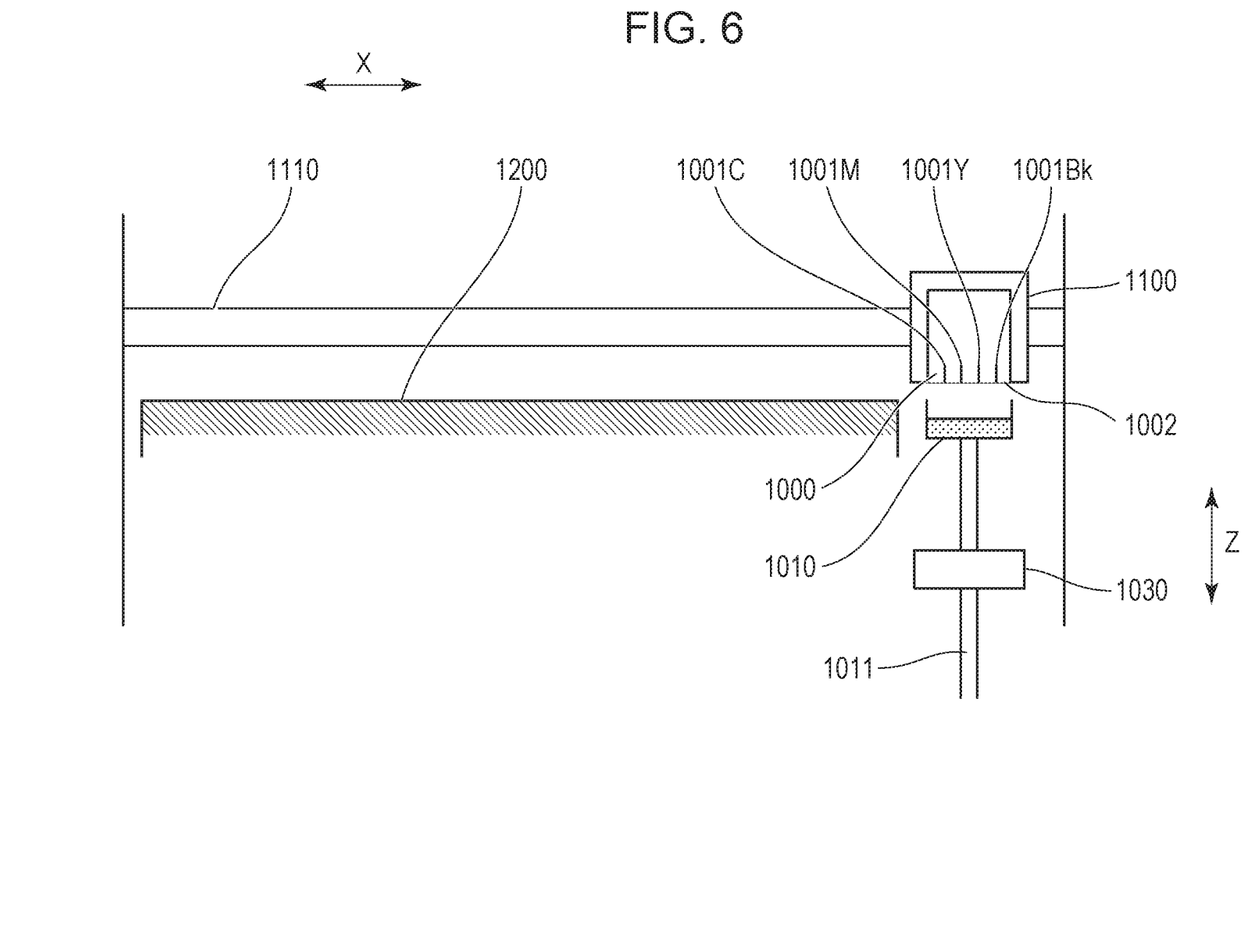
FIG. 6 is a schematic cross-sectional view of an ink jet recording apparatus according to a second embodiment of the present invention.

An ink jet recording apparatus according to a second embodiment of the present invention will now be described. FIG. 6 is a schematic cross-sectional view of the ink jet recording apparatus according to the second embodiment. The same reference numerals are used in FIG. 6 to identify the same components in FIG. 1. A description of such components is omitted herein.

Referring to FIG. 6, the recording head 1000 has the ejection port surface 1002 on which ejection port arrays 1001C, 1001M, 1001Y, and 1001Bk are provided. Cyan ink is ejected from the election port array 1001C, magenta ink is ejected from the ejection port array 1001M, yellow ink is ejected from the ejection port array 1001Y, and black ink is ejected from the ejection port array 1001Bk. In the ejection port array of each color of ink, 1,280 ejection ports from which the ink is ejected are arranged at intervals of 1,200 dots per inch (dpi) in a direction vertical to the plane of paper in FIG. 6, as in the first embodiment. An electrothermal transducer is provided in each ejection port. An electrical signal based on a driving signal is applied to the electrothermal transducer to generate air bubbles in the ink and the pressure of the air bubbles causes the ink to be ejected from the ejection ports.

Figure 7:
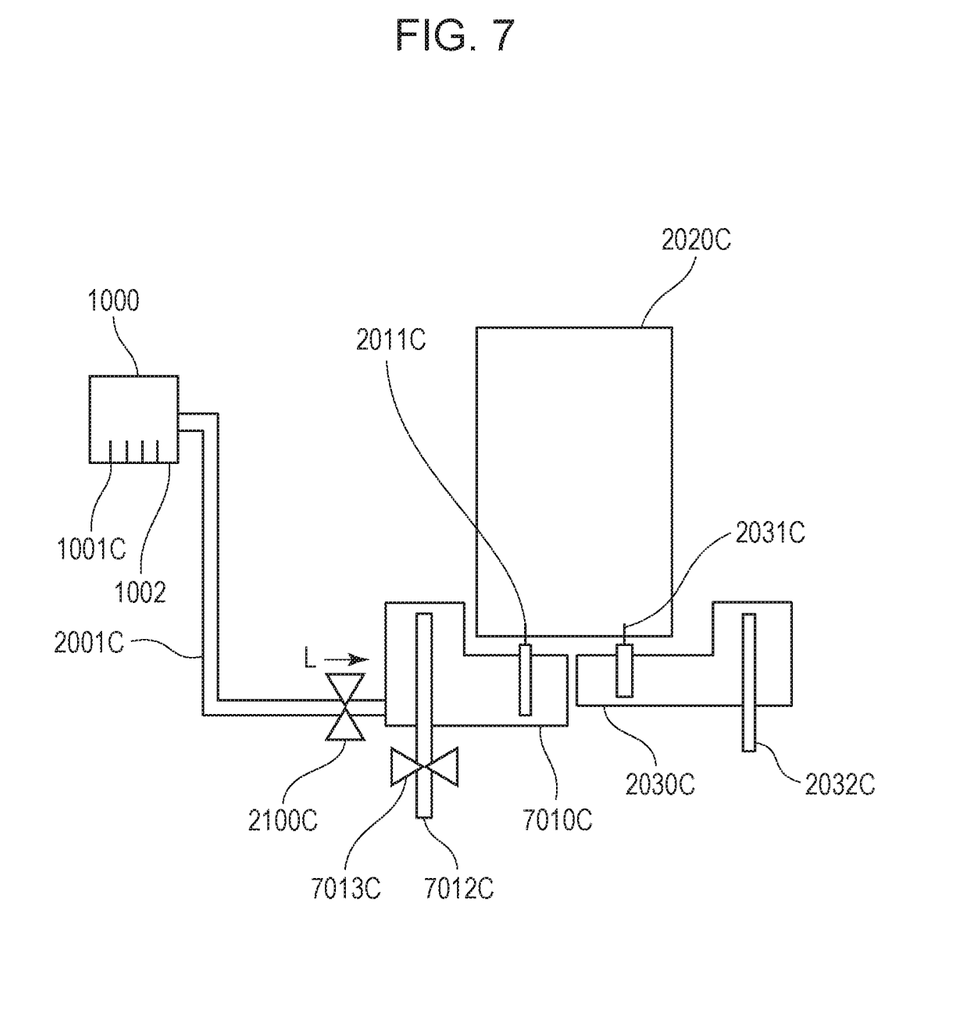
FIG. 7 is a schematic cross-sectional view of an ink supply system according to the second embodiment of the present invention.

An ink supply system in the ink jet recording apparatus having the above configuration will now be described with reference to FIG. 7. FIG. 7 is a schematic cross-sectional view of the ink supply system according to the second embodiment. Only the ink supply system communicating with the ejection port array 1001C is illustrated in FIG. 7 for simplification. Since the ink supply systems communicating with the ejection port arrays 1001M, 1001Y, and 1001Bk are similar to the ink supply system communicating with the ejection port array 1001C, a description of the ink supply systems communicating with the ejection port arrays 1001M, 1001Y, and 1001Bk is omitted herein.

Referring to FIG. 7, reference numeral 1000 denotes the recording head. The ejection port array 1001C of the recording head 1000 is connected to a sub-tank 7010C via a supply tube 2001C. The supply tube 2001C is provided with an on-off valve 2100C near the sub-tank 7010C. The on-off valve 2100C is capable of switching between an open state in which the sub-tank 7010C communicates with the election port array 1001C of the recording head 1000 and a closed state in which the sub-tank 7010C does not communicate with the election port array 1001C of the recording head 1000.

The sub-tank 7010C is provided with a hollow supply needle 2011C. The supply needle 2011C passes through a rubber stopper provided in an opposing main tank 2020C when the main tank 2020C is mounted to the mounting unit. The passing of the supply needle 2011C through the rubber stopper causes the sub-tank 7010C to communicate with the main tank 2020C. Inc sub-tank 7010C is provided with an air communication port 7012C and an air communication valve 7013C with which the sub-tank 7010C communicates with the air via the air communication port 7012C. The air communication valve 7013C is mainly used in a sub-tank filling operation described below and is normally closed.

A buffer tank 2030C is provided with a hollow supply needle 2031C. The supply needle 2031 passes through a rubber stopper provided in the opposing main tank 2020C when the main tank 2020C is mounted to the mounting unit. The passing of the supply needle 2031C through the rubber stopper causes the main tank 2020C to communicate with the buffer tank 2030C. The buffer tank 2030C is provided with an air communication port 2032C. The main tank 2020C communicates with the air via the buffer tank 2030C. Inc buffer tank 2030C temporarily stores the ink supplied from the main tank 2020C. As in the first embodiment, the ink level in the buffer tank 2030C is positioned below the ejection port surface 1002 of the recording head 1000 in the direction of gravity. Accordingly, the pressure in the recording head 1000 is kept at a negative pressure due to the so-called water head difference. The meniscus formed at the ejection ports is not destroyed owing to the water head difference.

The ink level in the sub-tank 7010C when the main tank 2020C is not mounted to the mounting unit is configured so as to be kept at substantially the same position as the ink level in the buffer tank 2030C in the direction of gravity. Accordingly, the ink jet recording apparatus is capable of replacing the main tank 2020C also during a recording operation.

The sub-tank 7010C includes a sub-tank sensor (not illustrated) to detect whether the ink level in the sub-tank 7010C is substantially equal to a position in the direction of gravity, indicated by an arrow L in FIG. 7. The ink jet recording apparatus of the second embodiment also includes a dot counter similar to that in the first embodiment. The ink volume in the sub-tank 7010C is capable of being detected with the sub-tank sensor and the dot counter. The sub-tank sensor may be an optical sensor or a sensor based on the presence of power applied between two electrodes.

The ink jet recording apparatus of the second embodiment also includes a main tank sensor (not illustrated) to detect whether the ink volume in the main tank 2020C is decreased to a small volume. The ink volume in the main tank 2020C is capable of being detected with the main tank sensor and the dot counter. The main tank sensor may be an optical sensor or a sensor based on the presence of power applied between two electrodes.

As in the first embodiment, the main tank 2020C includes a memory that stores the ink volume in the main tank 2020C. The mounting state of the main tank 2020C to the mounting unit is capable of being determined on the basis of whether power is supplied to the memory.

With the ink jet recording apparatus having the above configuration, it is possible to continue the recording with the ink held in a sub-tank 7010 even after the main tank 2020 has run out of the ink due to consumption through the recording or the like. The sub-tanks of cyan, magenta, yellow, and black are hereinafter collectively referred to as the sub-tank 7010. The recording with the ink in the sub-tank 7010 is continued until the ink volume in the sub-tank 7010 detected by the sub-tank sensor and the dot counter is decreased to a volume smaller than a predetermined value determined in accordance with the capacity of the sub-tank 7010. If the ink volume in the sub-tank 7010 is decreased to a volume smaller than the predetermined value, the ink jet recording apparatus notifies the user of the fact that the main tank 2020 should be replaced in the display unit.

Even when the user has replaced the main tank 2020 with a new main tank is main tank filled with the ink), only the replacement of the main tank 2020 with a new main tank does not move the ink in the main tank 2020 to the sub-tank 7010. This is because the inner diameter of the supply needle 2011 provided in the sub-tank 7010 is small and gas-liquid replacement is not performed in the supply needle 2011. Accordingly, when the main tank 2020 is replaced with a new main tank, the sub-tank filling operation is performed in which the ink is moved from the main tank 2020 to the sub-tank 7010 through an opening-closing operation of the on-off valve 2100 and an air communication valve 7013 to fill the sub-tank 7010 with the ink. The air communication valves of cyan, magenta, yellow, and black are hereinafter collectively referred to as the air communication valve 7013.

The sub-tank filling operation will now be described with reference to exemplary schematic cross-sectional views of the on-off valve 2100 illustrated in FIG. 8A and FIG. 8B.

Figure 8A:
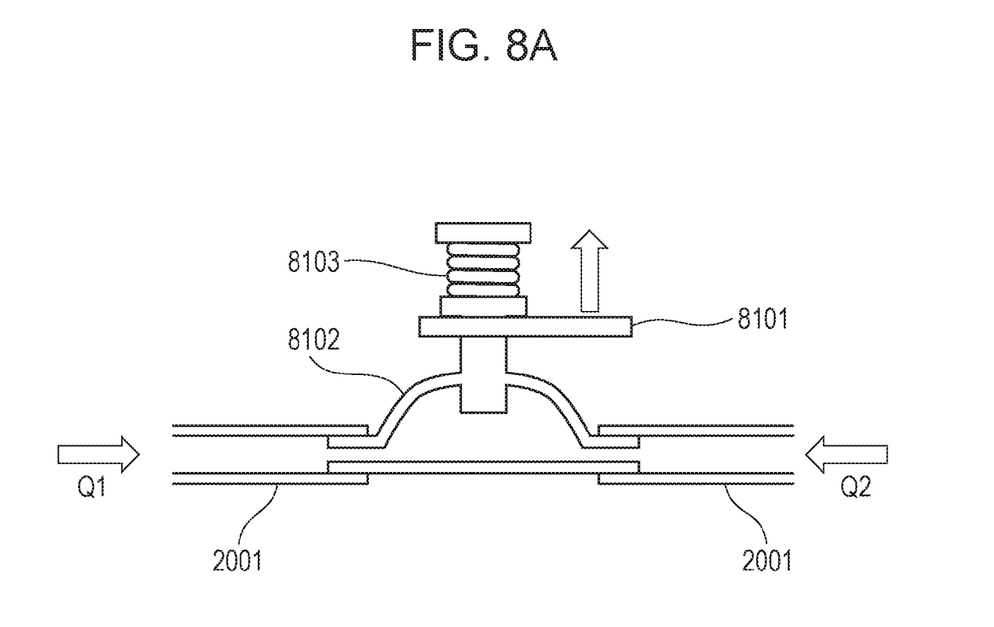
FIGS. 8A and 8B are schematic cross-sectional views of an on-off valve according to the embodiments of the present invention.
Figure 8B:
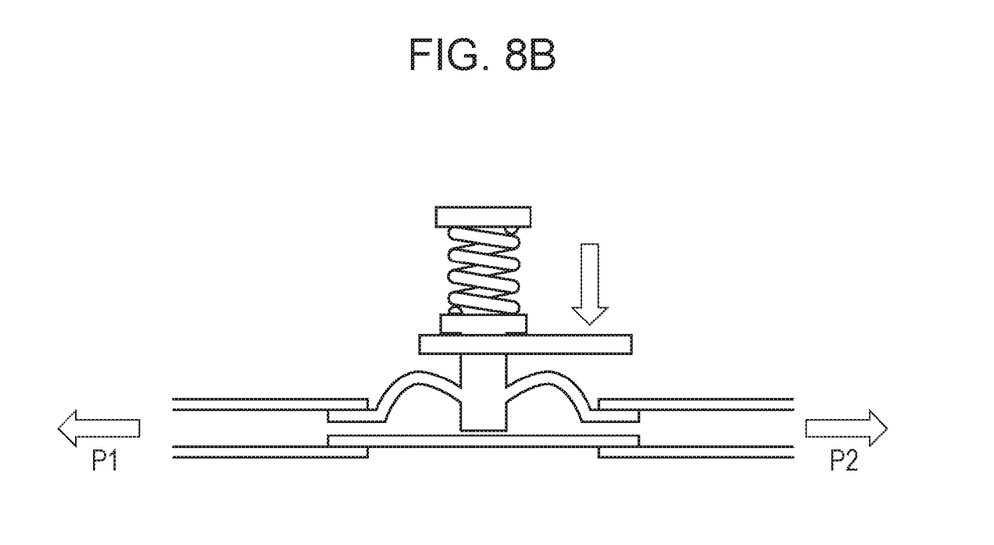

The on-off valve 2100 is connected to the sub-tank 7010 at the right side of FIG. 8A and FIG. 8B via the supply tube 2001 and is connected to the recording head 1000 at the left side of FIG. 8A and FIG. 8B via the supply tube 2001. In the example in FIG. 8A, a valve body 8102 of the on-off valve 2100 is pulled up by a lever 8101 and the sub-tank 7010 communicates with the recording head 1000. In contrast, in the example in FIG. 8B, the lever 8101 is moved downward to move the valve body 8102 downward and the ink flow path is blocked. The vertical movement of the lever 8101 causes the opening-closing operation to switch between the open state of the on-off valve 2100 and the closed state thereof. Reference numeral 8103 denotes a pressing-down spring that presses down the lever 8101.

When the closed state is switched to the open state, that is, the state in FIG. 8B is moved to the state in FIG. 8A in the on-off valve 2100 having the above structure, the capacity in the valve body 8102 is increased. The increase in capacity causes the ink to be sucked from the recording head 1000 side and the sub-tank 7010 side to the valve body 8102 side (arrows Q1 and Q2 in FIG. 8A). The suction of the ink indicated by the arrow Q2 in FIG. 8A decreases the pressure in the sub-tank 7010. When the air communication valve 7013 is closed at this time, the ink in the main tank 2020 moves to the sub-tank 7010. When the ink exists in the buffer tank 2030, the ink in the buffer tank 2030 moves to the main tank 2020. When no ink exists in the buffer tank 2030, the air moves into the main tank 2020 through the buffer tank 2030. In either case, the air flows into the buffer tank 2030 through the air communication port 2032. In addition, the ink is also sucked from the recording head 1000 side (the arrow Q1 in FIG. 8A). However, the decrease in pressure caused by the suction of the ink at this time is cleared by distortion of the flexible member (not illustrated) provided in the recording head 1000 for each ejection port array 1001.

In contrast, when the open state is switched to the closed state, that is, the state in FIG. 8A is moved to the state in FIG. 8B in the on-off valve 2100, the capacity in the valve body 8102 is decreased. The decrease in capacity causes the ink to be moved from the valve body 8102 side to the recording head 1000 side and the sub-tank 7010 side (arrows P1 and P2 in FIG. 8B). The movement of the ink indicated by the arrow P2 in FIG. 8B increases the pressure in the sub-tank 7010. When the air communication valve 7013 is opened at this time, the increase in pressure is cleared through the flow-out of the air through an air communication port 7012. The air communication ports of cyan, magenta, yellow, and black are hereinafter collectively referred to as the air communication port 7012. At this time, the ink also moves to the recording head 1000 side (the arrow P1 in FIG. 8B). However, the increase in pressure caused by the movement of the ink at this time is cleared by distortion of the flexible member (not illustrated) provided in the recording head 1000 for each ejection port array 1001.

Repetition of the opening-closing operation of the on-off valve 2100 and the air communication valve 7013 in the above manner, that is, repetition of a cycle in which "the air communication valve 7013 is opened, the on-off valve 2100 is closed, the air communication valve 7013 is closed, and the on-off valve 2100 is opened" fills the sub-tank 7010 with the ink. The sub-tank filling operation has been described above.

A pre-transportation processing sequence and a post-transportation processing sequence in the ink jet recording apparatus having the above configuration will now be described with reference to flowcharts in FIG. 9 and FIG. 10, respectively. Since the block diagram of a control system of the second embodiment is similar to the block diagram illustrated in FIG. 3, a description of the control system of the second embodiment is omitted herein.

Figure 9:
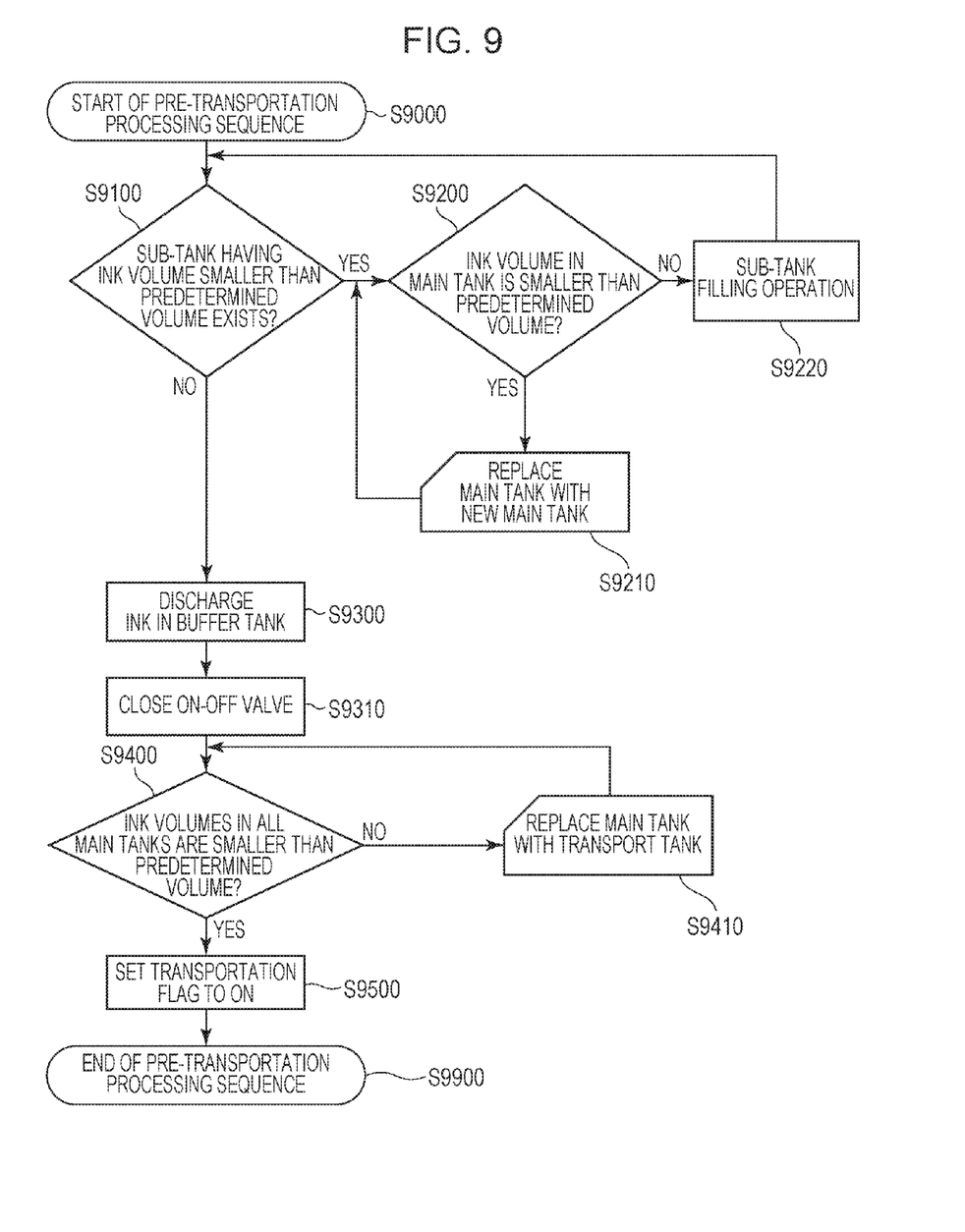
FIG. 9 is a flowchart illustrating a pre-transportation processing sequence in the ink jet recording apparatus according to the second embodiment of the present invention.

FIG. 9 is a flowchart illustrating the pre-transportation processing sequence in the ink jet recording apparatus according to the second embodiment. The pre-transportation processing sequence according to the second embodiment is also started upon depression of the Start key in the display unit-operation unit 3095 in the ink jet recording apparatus. As in the first embodiment, it is desirable that guidance or the like be appropriately given to the user with the display unit-operation unit 3095 in the pre-transportation processing sequence and the post-transportation processing sequence described below.

Referring to FIG. 9, in Step S9000, the pre-transportation processing sequence is started. In Step S9100, it is determined whether the ink volumes in the sub-tanks 7010C, 7010M, 7010Y, and 7010Bk are smaller than a predetermined volume (a second threshold value). Specifically, it is determined whether the ink levels in the sub-tanks 7010C, 7010M, 7010Y, and 7010Bk are below the position in the direction of gravity, indicated by the arrow L in FIG. 7, with the sub-tank sensor described above. If the determination in Step S9100 is affirmative, that is, if the ink volume in at least one of the sub-tanks 7010C, 7010M, 7010Y, and 7010Bk is smaller than the predetermined volume (the second threshold value) (YES in Step S9100), the processing sequence goes to Step S9200.

In Step S9200, it is determined whether the ink volume in the main tank 2020 of the color the ink volume in the sub-tank 7010 of which is smaller than the predetermined volume (the second threshold value) is smaller than a predetermined volume (a first threshold value). Specifically, it is determined whether the ink volume in the main tank 2020 is smaller than a predetermined very small volume (predetermined volume) with the main tank sensor described above. If the determination in Step S9200 is affirmative, that is, if the ink volume in the main tank 2020 is smaller than the predetermined volume (the first threshold value) (YES in Step S9200), the process goes to Step S9210. In Step S9210, the user is prompted to replace the main tank 2020 and the processing sequence waits for replacement of the main tank having an ink volume smaller than the predetermined volume (the first threshold value) with a new main tank (a main tank filled with the ink). Upon replacement of the main tank with a new main tank, the processing sequence returns to Step S9200.

If the determination in Step S9200 is negative, that is, if the ink volume in the main tank 2020 is larger than or equal to the predetermined volume (the first threshold value) (NO in Step S9200), in Step S9270, the sub-tank filling operation is performed. Specifically, the cycle in which "the air communication valve 7013 is opened, the on-off valve 2100 is closed, the air communication valve 7013 is closed, and the on-off valve 2100 is opened" described above is repeated five times. Upon completion of Step 39220, the processing sequence returns to Step S9100. Repetition of Step S9100 to Step S9220 makes the ink volumes in all the sub-tanks 7010 larger than or equal to the predetermined volume (the second threshold value). In other words, the ink levels in all the sub-tanks 7010 are above the position in the direction of gravity, indicated by the arrow L in FIG. 7.

If the determination in Step S9100 is negative, that is, if it is determined that the ink volumes in all the sub-tanks 7010 are larger than or equal to the predetermined volume (the second threshold value) (NO in Step S9100), the processing sequence goes to Step S9300. In Step S9300, the discharge operation to discharge the ink in the buffer tank is performed. Specifically, the suction pump 1030 is driven in a state in which the cap 1010 is at the capping position and the ink is sucked and discharged from each of the ejection port arrays 10010, 1001M, 1001Y, and 1001Bk. At this time, each of the on-off valve 2100C, an on-off valve 2100M, an on-off valve 2100Y, and an on-off valve 2100Bk is opened. In addition, each of the air communication valve 7013C, an air communication valve 7013M, an air communication valve 7013Y, and an air communication valve 7013Bk is closed. Furthermore, as in the first embodiment, the ink discharged into the cap 1010 and the pump tube 1011 through a sequence, such as the idle suction, is led to the maintenance cartridge to be held therein.

Substantially the entire volume of ink in each of the buffer tank 2030C, a buffer tank 2030M, a buffer tank 2030Y, and a buffer tank 2030Bk is discharged through this discharge operation. The specific amount of discharge of each color through the discharge operation in the second embodiment is about 8 ml.

No air flows in between the on-off valve 2100 and the recording head 1000 in the supply tube 2001 through this discharge operation. This is because the capacities of all the sub-tanks 7010 (the ink volume held in the sub-tank 7010 when the it level in the sub-tank 7010 is at the position in the direction of gravity, indicated by the arrow L in FIG. 7) are about 18 ml, which is larger than the amount of discharge of about 8 ml.

Upon completion of the discharge operation, in Step S9310, all the on-off valves 2100 are closed. Upon closing of all the on-off valves 2100, the processing sequence goes to Step S9400. In Step S9400, it is determined whether the ink volumes in all the main tanks 2020 are smaller than a predetermined volume. Specifically, it is determined whether the ink volumes in all the main tanks 2020 are smaller than a predetermined very small volume (predetermined volume) with the main tank sensor described above. If the determination in Step S9400 is negative, that is, if the ink volume in the main tank 2020 of at least one color is larger than or equal to the predetermined volume (NO in Step S9400), the process goes to Step S9410. In Step S9410, the user is prompted to replace the main tank 2020 having an ink volume larger than or equal to the predetermined volume with the transport tank and the processing sequence waits for replacement of the main tank 2020 with the transport tank. Upon detection of replacement of the main tank 2020 with the transport tank, the processing sequence returns to Step S9400. Step S9400 to Step S9410 make the ink volumes in all the main tanks 2020 smaller than the predetermined volume.

If the determination in Step S9400 is affirmative, that is, if it is determined that the ink volumes in all the main tanks 2020 are smaller than the predetermined volume (YES in Step S9400), the processing sequence goes to Step S9500. In Step S9500, the transportation flag is set to ON. The transportation flag is used in the post-transportation processing sequence, as in the first embodiment.

After the transportation flag is set to ON, the apparatus is automatically turned off and, in Step 9900, the pre-transportation processing sequence is terminated. At this time, the cap 1010 is at the capping position.

The pre-transportation processing sequence described above prevents leakage of the ink during the transportation without discharging substantially the entire volume of ink in the ink jet recording apparatus. The advantages of the pre-transportation processing sequence will now be described.

First, the ink volume in the main tank 2020 that is mounted during the transportation is smaller than a predetermined volume (very small volume). Accordingly, the ink volume pushed into the buffer tank 2030 is very small even if the air in the main tank 2020 expands due to the variation in the environmental temperature or the atmospheric pressure during the transportation. In addition, since substantially the entire volume of ink in the buffer tank 2030 is discharged in Step S9300, leakage of the ink through the air communication port 2032 does not occur even if the air in the buffer tank 2030 expands. Furthermore, even if the air in the sub-tank 7010 expands, the ink pushed from the sub-tank 7010 only moves to the main tank 2020 and leakage of the ink does not occur because the on-off valve 2100 is closed in Step S9310. The increase in pressure caused by the expansion of the small amount of air existing between the on-off valve 2100 and the recording head 1000 in the supply tube 2001 or the small amount of air existing in the recording head 1000 is cleared by distortion of the flexible member provided in the recording head 1000 for each ejection port array 1001. Accordingly, even if the air in the ink supply system expands due to the great variation in the environmental temperature or the atmospheric pressure during the transportation, leakage of the ink does not occur.

Next, a case will be described in which the ink jet recording apparatus is inclined during the transportation. Since the on-off valve 2100 is closed in Step S9310, the pressure in the recording head is not changed to a positive pressure or a negative pressure having a large absolute value even if the apparatus is greatly inclined. Accordingly, the meniscus formed at the ejection ports is not destroyed and leakage of the ink does not occur. In addition, since substantially the entire volume of ink in the buffer tank 2030 is discharged in Step S9300, no ink leaks from the air communication port 2032 even if the ink jet recording apparatus is greatly inclined.

As described above, it is possible to prevent leakage of the ink during the transportation without discharging substantially the entire volume of ink in the ink jet recording apparatus.

The post-transportation (when the ink jet recording apparatus is started) processing sequence in the ink jet recording apparatus according to the second embodiment will now be described with reference to a flowchart in FIG. 10. The post-transportation processing sequence according to the second embodiment is also started when the transportation flag is set to ON upon turning on of the ink jet recording apparatus, as in the first embodiment.

Figure 10:
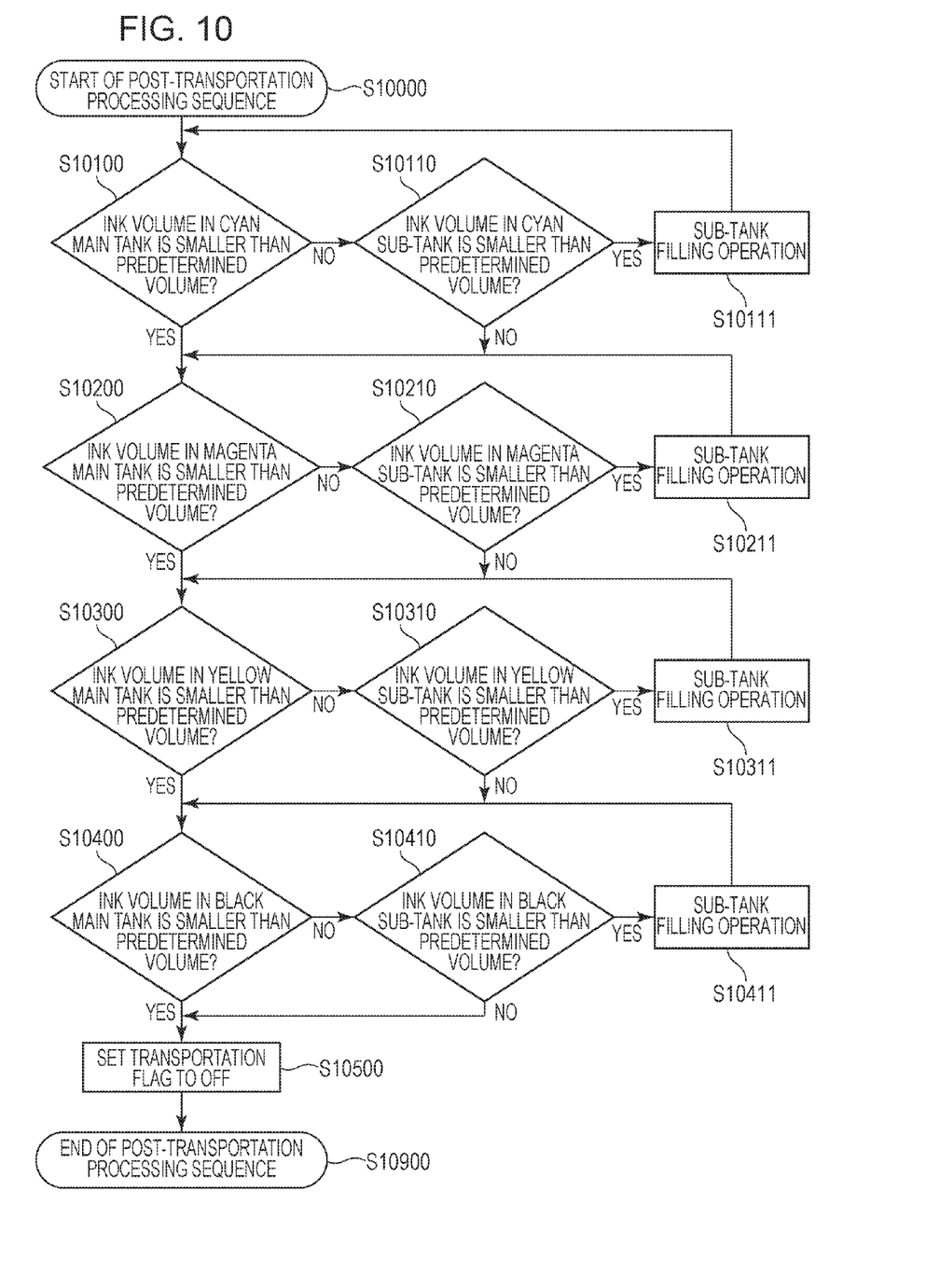
FIG. 10 is a flowchart illustrating a post-transportation processing sequence in the ink jet recording apparatus according to the second embodiment of the present invention.

Referring to FIG. 10, in Step S10000, the post transportation processing sequence is started. In Step S10100, it is determined whether the ink volume in the main tank 2020C of cyan is smaller than a predetermined volume. Specifically, it is determined whether the ink volume in the main tank 2020C of cyan is smaller than a predetermined very small volume (predetermined volume) with the main tank sensor described above. If the determination in Step S10100 is negative, that is, if the ink volume in the main tank 2020 of cyan is larger than or equal to the predetermined volume (NO in Step S10100), the process goes to Step S10110. It has been determined that the ink volume in the mounted main tank 2020 is smaller than the predetermined volume in the pre-transportation processing sequence. The ink volume that is larger than or equal to the predetermined volume in spite of the above determination may indicate that the cyan ink in the sub-tank 7010C moves to the main tank 2020C during the transportation. In other words, it is estimated that the air in the ink supply system of the ink jet recording apparatus has expanded because the post-transportation environmental temperature is higher than the pre-transportation environmental temperature or the post-transportation atmospheric pressure is lower than the pre-transportation atmospheric pressure. The expansion of the air in the ink supply system of the ink jet recording apparatus causes the ink pushed out from the sub-tank 7010 to move to the main tank 2020, as described above. Accordingly, in the post-transportation processing sequence in the second embodiment, the ink that has moved to the main tank 2020 is returned to the sub-tank 7010 through the sub-tank filling operation described above. This will be described in detail below.

In Step S10110, it is determined whether the ink volume in the sub-tank 7010C of cyan is smaller than the predetermined volume (the second threshold value). Specifically, it is determined whether the ink level in the sub-tank 7010C of cyan is below the position in the direction of gravity, indicated by the arrow L in FIG. 7, with the sub-tank sensor described above. If the determination in Step S10110 is affirmative, that is, if the ink volume in the sub-tank 7010C of cyan is smaller than the predetermined volume (the second threshold value) (YES in Step S10110), the processing sequence goes to Step S10111. As described above, when the ink in the sub-tank 7010 moves to the main tank 2020 because the air in the ink supply system expands due to the increase in the environmental temperature or the decrease in the atmospheric pressure from the pre-transportation to the post-transportation, the determination in Step S10110 may be affirmative.

In Step S10111, the sub-tank filling operation is performed. Specifically, the cycle in which "the air communication valve 7013 is opened, the on-off valve 2100 is closed, the air communication valve 7013 is closed, and the on-off valve 2100 is opened" described above is repeated five times. The sub-tank filling operation of a color other than cyan may be simultaneously performed. Upon completion of the sub-tank filling operation, the processing sequence returns to Step S10100.

If the determination in Step S10110 is negative, that is, if the ink volume in the sub-tank 7010C of cyan is larger than or equal to the predetermined volume (the second threshold value) (NO in Step S10110), the processing sequence goes to Step S10200 without performing the sub-tank filling operation.

If the determination in Step S10100 is affirmative, that is, if the ink volume in the main tank 2020C of cyan is smaller than the predetermined volume (YES in Step S10100), the processing sequence goes to Step S10200.

Step S10100 to Step S10111 make the ink volume in the main tank 2020C of cyan smaller than the predetermined volume or the ink volume in the sub-tank 7010C of cyan larger than or equal to the predetermined volume.

In Step S10200, it is determined whether the ink volume in the main tank 2020M of magenta is smaller than the predetermined volume. Specifically, it is determined whether the ink volume in the main tank 2020M of magenta is smaller than the predetermined very small volume with the main tank sensor described above. Since Step S10210 to Step S10211 are similar to Step S10110 to Step S10111 described above, a description of Step S10210 to Step S10211 is omitted herein. Step S10200 to Step S10211 make the ink volume in the main tank 2020M of magenta smaller than the predetermined volume or the ink volume in the sub-tank 7010M of magenta larger than or equal to the predetermined volume. Similarly, Step S10300 to Step S10311 make the ink volume in the main tank 2020Y of yellow smaller than the predetermined volume or the ink volume in the sub-tank 7010Y of yellow larger than or equal to the predetermined volume. In addition, Step S10400 to Step S10411 make the ink volume in the main tank 2020Bk of black smaller than the predetermined volume or the ink volume in the sub-tank 7010Bk of black larger than or equal to the predetermined volume.

Step S10100 to Step S10411 causes the ink that has moved from the sub-tank 7010 to the main tank 2020 due to the expansion of the air in the ink supply system during the transportation to be returned to the sub-tank 7010.

Upon completion of Step S10100 to Step S10411, the processing sequence goes to Step S10500. In Step S10500, the transportation flag is set to OFF. In Step S10900, the post-transportation processing sequence is terminated.

Then, the user is appropriately prompted to, for example, replace the main tank in the display unit or the like. In addition, it is preferred that the recovery process or the like suitable for the time when the ink jet recording apparatus has been left be appropriately performed.

The post-transportation processing sequence according to the second embodiment allows the ink jet recording apparatus to be transported with a small waste ink volume while improving the user friendliness.

Other Embodiments

The sub-tank filling operation is performed through the opening-closing operation of the on-off valve and the air communication valve in the second embodiment. However, the second embodiment is not limited to this. For example, a suction pump or the like may be connected to the sub-tank to suck and discharge the air in the sub-tank.

The discharge operation to discharge the ink in the buffer tank is performed with the suction pump driven in the state in which the on-off valve is opened in the above embodiments. However, the embodiments are not limited to this. For example, a suction method may be adopted in which the suction pump is driven in the state in which the on-off valve is closed, that is, a high negative pressure is accumulated in the recording head or the supply tube and, then, the on-off valve is opened.

The discharge operation is performed by sucking and discharging the ink from the ejection ports of the recording head in the above embodiments. However, the embodiments are not limited to this. For example, the ink may be sucked and discharged from the supply needle (the communication port of the buffer tank with the main tank) with a pump or the like in a state in which the main tank is removed from the ink jet recording apparatus.

The recording head of a so-called thermal ink jet type is adopted in the above embodiments. However, the present invention is applicable to cases in which recording heads of piezoelectric or other types are adopted.

According to the present invention, an ink jet recording apparatus capable of transporting the ink jet recording apparatus with a small waste ink volume while improving the user friendliness and a pre-transportation processing method for the ink jet recording apparatus are provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-102294, filed May 19, 2015, which is hereby incorporated by reference herein in its entirety.

What is claimed is:
1. An ink jet recording apparatus comprising:
a recording head configured to eject ink;
a buffer tank configured to temporarily store the ink;
a mounting unit to which a main tank that stores the ink is capable of being mounted, the main tank having a first supply port from which the ink is supplied to the recording head and a second supply port from which the ink is supplied to the buffer tank;
a detecting unit configured to detect an ink volume in the main tank; and
a control unit configured to perform a discharge operation to discharge the ink in the buffer tank from the recording head via the main tank in a pre-transportation process in the ink jet recording apparatus,
wherein the control unit prompts a user to replace the main tank without performing the discharge operation if the ink volume detected by the detecting unit is smaller than a threshold value.
2. The ink jet recording apparatus according to claim 1, further comprising:
a suction cap configured to cover the recording head and to suck the ink from the recording head,
wherein the control unit performs the discharge operation with the suction cap.
3. The ink jet recording apparatus according to claim 1, further comprising:
a valve configured to be capable of switching between an open state in which the mounting unit communicates with the recording head and a closed state in which the mounting unit does not communicate with the recording head,
wherein the control unit prompts the user to mount a transport tank to the mounting unit after the control unit sets the valve to the closed state after the discharge operation if the ink volume detected by the detecting unit is larger than the threshold value.
4. An ink jet recording apparatus comprising:
a recording head configured to elect ink;
a sub-tank configured to store the ink to be supplied to the recording head;
a buffer tank configured to temporarily store the ink;
a mounting unit to which a main tank that stores the ink is capable of being mounted, the main tank having a first supply port from which the ink is supplied to the sub-tank and a second supply port from which the ink is supplied to the buffer tank;

a first detecting unit configured to detect an ink volume in the main tank; and a control unit configured to perform a discharge operation to discharge the ink in the buffer tank from the recording head via the main tank and the sub-tank in a pre-transportation process in the ink jet recording apparatus, wherein the control unit prompts a user to replace the main tank without performing the discharge operation if the ink volume detected by the first detecting unit is smaller than a first threshold value.

5. The ink jet recording apparatus according to claim 4, further comprising:

a suction cap configured to cover the recording head and to suck the ink from the recording head, wherein the control unit performs the discharge operation with the suction cap.

6. The ink jet recording apparatus according to claim 4, further comprising:

a second detecting unit configured to detect an ink volume in the sub-tank, wherein the control unit performs a sub-tank filling operation to move the ink from the main tank to the sub-tank to fill the sub-tank with the ink, without performing the discharge operation, if the ink volume detected by the second detecting unit is smaller than a second threshold value.

7. The ink jet recording apparatus according to claim 4, further comprising:

a valve configured to be capable of switching between an open state in which the sub-tank communicates with the recording head and a closed state in which the sub-tank does not communicate with the recording head, wherein the control unit prompts the user to mount a transport tank to the mounting unit after the control unit sets the valve to the closed state after the discharge operation if the ink volume detected by the second detecting unit is larger than the second threshold value.

8. The ink jet recording apparatus according to claim 4, wherein the control unit performs a sub-tank filling operation to move the ink from the main tank to the sub-tank to fill the sub-tank with the ink if the ink volume detected by the first detecting unit when the ink jet recording apparatus is started is larger than a predetermined volume in a post-transportation process in the ink jet recording apparatus.

9. A pre-transportation processing method for an ink jet recording apparatus including a recording head that ejects ink; a buffer tank that temporarily stores the ink; a mounting unit to which a main tank that stores the ink is capable of being mounted, the main tank having a first supply port from which the ink is supplied to the recording head and a second supply port from which the ink is supplied to the buffer tank; and a detecting unit that detects an ink volume in the main tank, the method comprising:

performing a discharge operation to discharge the ink in the buffer tank from the recording head via the main tank in a pre-transportation process in the ink jet recording apparatus, wherein a user is prompted to replace the main tank without the discharge operation if the ink volume detected by the detecting unit is smaller than a threshold value.

10. A pre-transportation processing method for an ink jet recording apparatus including a recording head that ejects ink; a sub-tank that stores the ink to be supplied to the recording head; a buffer tank that temporarily stores the ink; a mounting unit to which a main tank that stores the ink is capable of being mounted, the main tank having a first supply port from which the ink is supplied to the sub-tank and a second supply port from which the ink is supplied to the buffer tank; and a detecting unit that detects an ink volume in the main tank, the method comprising:

performing a discharge operation to discharge the ink in the buffer tank from the recording head via the main tank and the sub-tank in a pre-transportation process in the ink jet recording apparatus, wherein a user is prompted to replace the main tank without the discharge operation if the ink volume detected by the first detecting unit is smaller than a threshold value.

* * * * *